US005408416A

United States Patent [19]

Gilham

[11] Patent Number: 5,408,416

[45] Date of Patent: Apr. 18, 1995

[54] FRANKING MACHINE

[75] Inventor: Dennis T. Gilham, Brentwood, United Kingdom

[73] Assignee: Neopost Limited, Romford, United Kingdom

[21] Appl. No.: 208,913

[22] Filed: Mar. 11, 1994

Related U.S. Application Data

[63] Continuation of Ser. No. 123,713, Sep. 20, 1993, abandoned, which is a continuation of Ser. No. 921,964, Aug. 4, 1992, abandoned, which is a continuation of Ser. No. 783,376, Oct. 28, 1991, abandoned, which is a continuation of Ser. No. 457,368, Dec. 27, 1989, abandoned.

[30] Foreign Application Priority Data

Dec. 30, 1988 [GB] United Kingdom ................ 8830421

[51] Int. Cl.[6] ........................ G06F 15/20; G07B 17/00

[52] U.S. Cl. ................................ 364/464.02; 101/71

[58] Field of Search ............. 101/71, 91, 93.04, 93.07; 364/464.02

[56] References Cited

U.S. PATENT DOCUMENTS

| | | | |
|---|---|---|---|
| 3,671,451 | 6/1972 | Butterfield | 252/301.35 |
| 4,015,131 | 3/1977 | McDonough et al. | 250/461.1 |
| 4,280,082 | 7/1981 | Acharya et al. | 388/811 |
| 4,481,604 | 11/1984 | Gilham et al. | 364/464.02 |
| 4,580,144 | 4/1986 | Calvi | 235/101 |
| 4,581,616 | 4/1986 | Ross et al. | 235/101 |
| 4,660,221 | 4/1987 | Dlugos | 235/101 |
| 4,746,234 | 5/1988 | Harry | 101/91 X |
| 4,789,874 | 12/1988 | Majett et al. | 346/140 R |
| 4,849,884 | 7/1989 | Axelrod et al. | 364/464.02 X |
| 4,852,785 | 8/1989 | Bettendorf et al. | 226/42 |
| 4,873,645 | 10/1989 | Hunter et al. | 364/464.02 |
| 4,888,803 | 12/1989 | Pastor | 364/464.02 |
| 4,917,010 | 4/1990 | Gilham et al. | 101/93.04 |
| 4,929,099 | 5/1990 | Graham et al. | 400/76 |
| 5,009,137 | 4/1991 | Dannatt | 177/4 X |
| 5,119,466 | 6/1992 | Suzuki | 388/831 |
| 5,291,114 | 3/1994 | Shirotori et al. | 318/685 |

*Primary Examiner*—Edward R. Cosimano

*Attorney, Agent, or Firm*—Shoemaker and Mattare, Ltd.

[57] ABSTRACT

A machine for printing a postage stamp for application to a mail item includes a a thermal printer to print the stamp on a tape of thermally sensitive paper. The speed of feeding of the tape is controlled to be uniform to synchronize with the operation of the printer. The printer is non-secure and accounting for the value of postage charge printed on the stamps is accomplished by machine reading of the stamps by the Postal Authority. The stamp printing machine generates an accumulated value of postage charge for a series of stamps printed and then prints, on the same tape, a label including an indication of user account and accumulated value, the value preferably being in encoded form.

5 Claims, 4 Drawing Sheets

FRANKING MACHINE

This is a continuation of application Ser. No. 08/123,713 filed Sep. 20, 1993 now abandoned, which is a continuation of application Ser. No. 07/921,964 filed Aug. 4, 1992 now abandoned, which is a continuation of application Ser. No. 07/783,376 filed Oct. 28, 1991 now abandoned which is a continuation of application Ser. No. 07/457,368 filed Dec. 27, 1989 now abandoned.

BACKGROUND OF THE INVENTION

This invention relates to machines for applying a printed stamp to postal items.

When items are to be carried by a postal authority for delivery to a destination address, payment for carriage of the item is made to the postal authority by purchase of one or more postage stamps which are then affixed to the postal item. The stamps affixed to the postal item provide an indication during subsequent handling of the postal item by the postal authority that a postage charge has been paid and the amount or value of the postage charge paid.

The purchase and affixing of postage stamps is inconvenient particularly for regular senders of postal items requiring variable postage such as small commercial users of the postal service. In order to overcome the need for purchase of postage stamps prior to despatch of postal items, franking machines were introduced. Franking machines are operated by persons or companies desiring to despatch postal items and are operated under licence from the postal authority. The franking machine is caused to print on the postal item a frank impression of a form prescribed by the postal authority which includes an impression of the value of postage franked on the item. In order for the user of the franking machine to be able to account to the postal authority for the value of postage used to the satisfaction of the postal authority, it has been necessary to provide the franking machine with accounting means to maintain an accurate record of the usage of the machine and the accumulated value of franking applied by the machine. Commonly, the postal authority requires prepayment for usage of the machine. Accordingly the machine includes a register to record the value of credit, purchased by the user from the postal authority, which remains available for usage in franking. The machine is constructed such that, when the registered value of credit decreases to a predetermined low limit, the machine locks and prevents further usage of the machine until additional credit has been entered in the register of the machine by the postal authority in response to payment by the user. Modern franking machines utilize electronic circuits for carrying out accounting and control functions within the machine. These circuits include a micro-processor and memory devices providing registers for registering accounting values. The registers usually include a descending register into which the value of purchased credit is entered and which is decremented during usage of the machine by the value of franking used in each franking transaction. The registers also include an ascending register to register the accumulated value of franking used and an items register for registering the number of mail items franked by the machine. In order to maintain integrity of the values registered in the various registers, each of the registers is replicated, each replication storing corresponding values. Thus if due to a fault in the operation of the electronic circuits the value registered in one of the replications of a register differs from the value registered in the other replications of that register an indication is provided that a fault has occurred and the true accounting value can be retrieved from the other replications of that register.

If the electronic accounting circuits and the value setting mechanisms by which print elements for printing the value of franking are unprotected, the values registered in the registers and/or the values of postage printed in the franking could be changed by anyone with fraudulent intent. Accordingly it has been necessary to house the circuitry and printing mechanism in a secure manner such as to prevent unauthorised access to these parts of the machine.

The provision of replicated registers and particularly the provision of a secure housing for the circuits and print setting mechanism adds greatly to the cost of manufacturing franking machines. As a result franking machines are too expensive for purchase by users who despatch relatively small quantities of postal items and therefore users who despatch relatively small quantities of postal items are compelled to use postage stamps which may be inconvenient, time consuming and in addition are somewhat un-hygienic to use.

SUMMARY OF THE INVENTION

According to one aspect of the invention a postage stamp printing machine comprises electronic control means; means to store data relating to fixed information to be printed; means to input selected variable postage rate data to the control means; printing means operable by said control means to effect a printing routine in which the fixed information and the selected variable postage rate information is printed; feed means to feed a mail item past the printing means to cause printing of a postage stamp on the mail item; means to control the speed at which said mail item is fed to a substantially constant speed.

It is preferred to print the stamp on a paper tape and accordingly the postage stamp printing machine may include severing means operable to sever a printed stamp from the paper tape.

The printing means conveniently includes a thermal print head comprising a line of selectively energisable printing elements which are heated by energisation thereof to print upon a tape of thermally sensitive paper.

The machine may include means to print a stripe of fluorescent or phosphorescent ink on the mail item.

The machine may be controlled by a program routine to print at least one mark identifying selected data printed on the stamp.

The machine may also be controlled by a program routine to print a statement label carrying data relating to a preceding printing of one or more postage stamps.

According to another aspect of the invention a method of printing postage stamps and accounting for value of stamps printed includes the steps of utilizing a non-secure printer to print a series of postage stamps, each printed postage stamp including an indication of postage charge for the respective postage stamp; and utilizing reading means to read each of the series of postage stamps and to generate an accumulated total postal charge for the series of postage stamps.

The statement label may be printed on the same paper tape as that on which the postage stamps are printed.

BRIEF DESCRIPTION OF THE DRAWING

An embodiment of the invention will now be described with reference by way of example to the drawings in which.

DESCRIPTION OF THE PREFERRED EMBODIMENT

Figure 1:
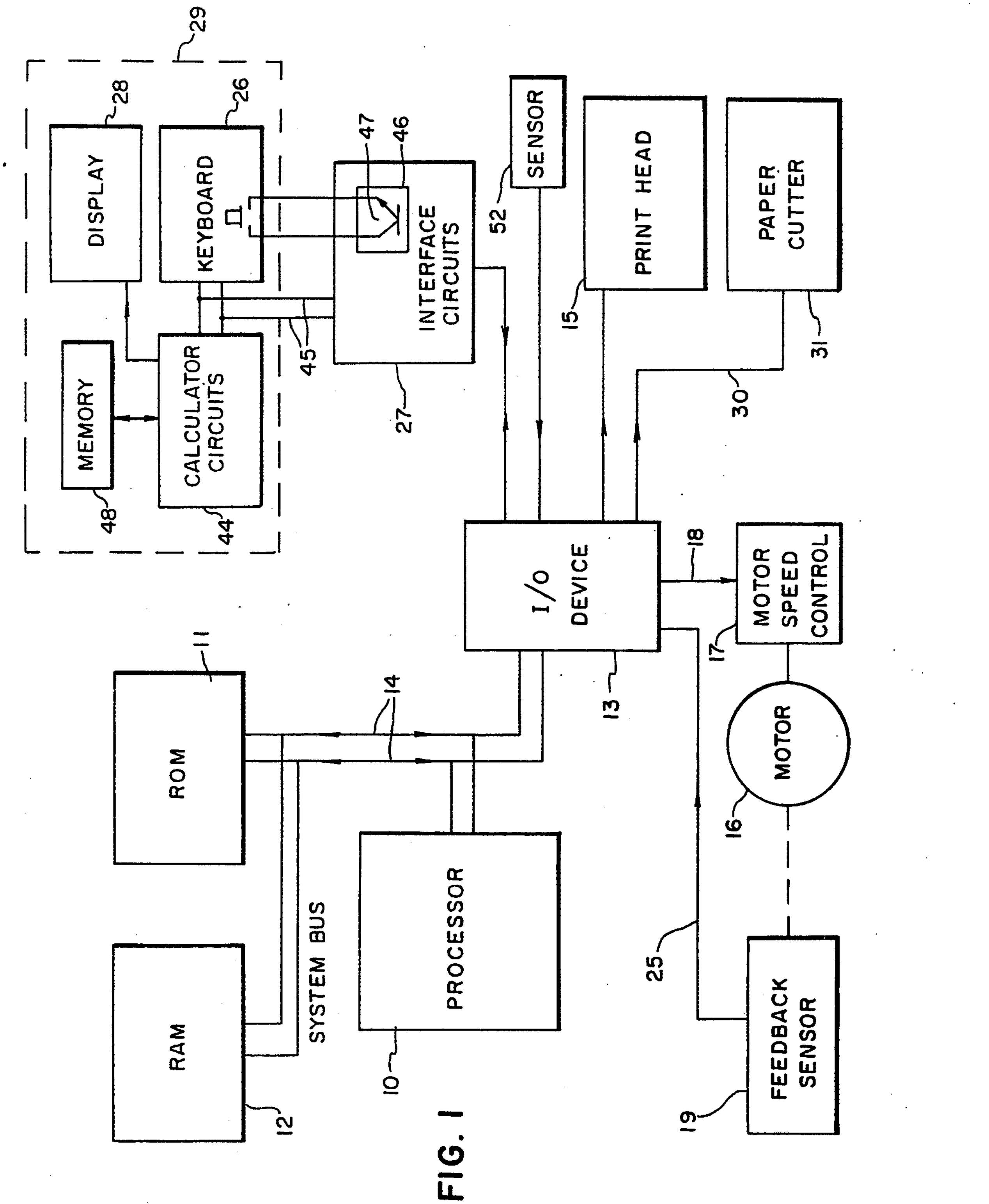
FIG. 1 is a block circuit diagram of the electronic components and interconnections of a stamp printer in accordance with the invention, FIGS. 2(*a*) and 2(*b*) are axial and transverse views of a sensor for sensing paper speed.
Figure 2A:
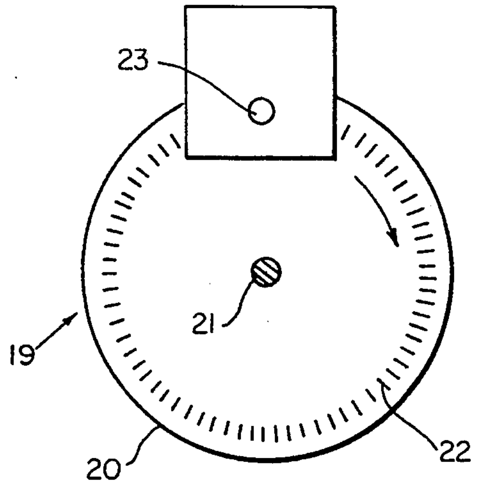
Figure 2B:
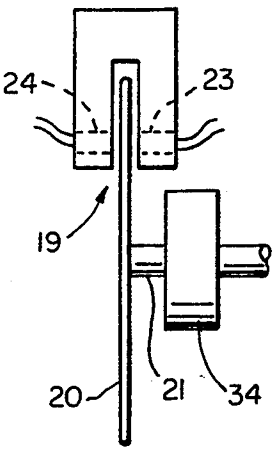

Referring first to FIG. 1, the stamp printer comprises a micro-processor 10, a read only memory 11, a random access memory 12 and an input/output device 13 interconnected by a system bus 14. If desired the micro-processor, memories and input/output device may be implemented in a single integrated circuit chip. A thermal print head 15 comprising a line of print elements which are selectively energisable to heat selected print elements is connected to the input/output device 13. A tape of heat sensitive paper is fed past the print head, in a direction transverse to the line of print elements, by means of a feed roller and co-operating pressure roller, the pressure roller being effective to maintain the tape in contact with the elements of the print head as the tape passes the print elements. The feed roller is driven by a motor 16 energised by a motor drive circuit 17. The motor drive circuit is controlled by an output on line 18 from the micro-processor 10. Printing data for printing a stamp on the tape is sent to the print head serially and is clocked by clock signals on a clock line of the system bus 14. Feeding of the paper tape is maintained at a substantially constant speed so that printing is effected in synchronism with movement of the paper tape. The speed of feeding the paper tape is sensed by a sensor 19 driven with the feed roller 34 which, as shown in FIGS. (2) and 2(*b*), may consist of a disc 20 on the feed roller shaft 21 provided with a track 22 of alternate transparent and opaque regions and a photo transistor 23 responsive to light transmitted through the transparent regions from a source of light 24, such as a light emitting diode. Signals from the photo transistor 23 consisting of a train of pulses whose repetition rate is proportional to the speed of rotation of the feed roller are input to the micro-processor 10 on line 25. The micro-processor utilizes these signals to control the motor drive circuit 17 such as to maintain the speed of rotation of the feed roller substantially constant. The speed of the motor is controlled by the magnitude of power input to the motor. The motor may be driven by a train of pulses from the drive circuit and the power input to the motor may be varied by varying the width of pulses at constant frequency or by varying the frequency of the constant width pulses. Alternatively, a digital output from the micro-processor representing the magnitude of power input to the motor may be converted, by a digital to analogue converter, to an analogue signal which is input to a power operational amplifier to produce a variable voltage output drive to the motor, the voltage magnitude being such as to provide the desired magnitude of power to the motor.

A line 30 connects a cutter 31 to the input/output device 13 and a sensor 52 is connected to the input/output device 13. Operation of the cutter 31 and the sensor 52 will be described hereafter.

Operation of the stamp machine is controlled by a user by means of inputs on a keyboard 26 which is connected by interface circuit 27 to the micro-processor 10. Some of the keys of the keyboard may be designated to provide function signals to the micro-processor such as a start signal to initiate operation of a print routine. Other keys are designated to provide numerical data input to the micro-processor to enable a user to input the postage value of the next stamp to be printed. A display device 28 is provided to display data to a user, such data for example including an echo of the input on the keyboard to enable a user to verify that the required input has been made. In addition to inputs on the keyboard 26, the micro-processor may also be connected to receive inputs from external peripheral devices such as a weighscale.

The keyboard and display would usually be constructed as dedicated devices integral with the stamp machine. However, if desired, the keyboard and display device may be implemented by utilization of a commercially available electronic calculator as indicated by the dotted line 29. Such a calculator includes electronic circuits 44 for scanning the state of the keys of the keyboard and for displaying the keyboard input on the display device. Also the electronic circuits are arranged to carry out arithmetical functions and include a memory for retaining the results of an arithmetical operation. The calculator includes scan lines 45 connected to the keyboard whereby the electronic circuit 44 of the calculator senses which one if any of the keys have been operated. The interface circuit 27 provides connections from these scan lines 45 to the input/output device 13 whereby the micro-processor 10 receives inputs corresponding to operation of the respective keys of the keyboard of the calculator. Thus operation of a key not only inputs data to the electronic arithmetic circuit of the calculator but also inputs the same data to the micro-processor 10. In addition, the interface circuit includes circuits 46 to enable data output from the micro-processor to be input to the keyboard of the calculator and thereby be displayed by the display device. Only one circuit is shown in the drawing but it will be appreciated that separate circuits 46 are provided for each key for which such input is desired. These circuits 46 consist of NPN transistors 47 connected by their emitters and collectors across the terminals of each key respectively. The bases of the transistors are driven by signals from assigned output lines of the input/output device 13 so that a signal driving the base of a selected one of the transistors turns that transistor ON, i.e. to a state in which the emitter collector path is low resistance, and thereby produces a low resistance between the contacts for that key such as would have occurred due to manual operation of that key.

If a calculator is utilized to provide keyboard and display functions, a memory 48 of the calculator may be utilized to maintain a short term record of the total value of stamps printed by the machine. For example to print a stamp of postal value 19p, the user enters '1' followed by '9' and then operates the M+ (memory) key. Thus the value 19 is entered into the calculator and entered in the calculator memory. Also the value 19 entered on the keyboard is input to the micro-processor 10 by means of the interface circuit. The micro-processor is thereby enabled to control a print routine to print a stamp with the postage value of 19p. The micro-processor is also programmed to add this value to the contents of a register in the random access memory which maintains a cumulative total of postage values printed by the machine. If further stamps of the same postage value are required, the user operates the 'RM' (recall memory) key followed by the '+' key. Operation of the 'M+' or 'RM' keys may be utilised to initiate a print routine by the micro-processor. The micro-processor may also be programmed to maintain a count of the number of postage stamps printed, such count being stored in a register of the random access memory 12.

When it is desired to display data from the micro-processor and memories 12 and 13, operation of one or more designated keys of the keyboard may be utilized to initiate an appropriate program routine. The data is then output by the microprocessor to the designated output lines of the input/output device to turn on the transistors connected to the key contacts and thereby display the data on the display device.

Figure 3:
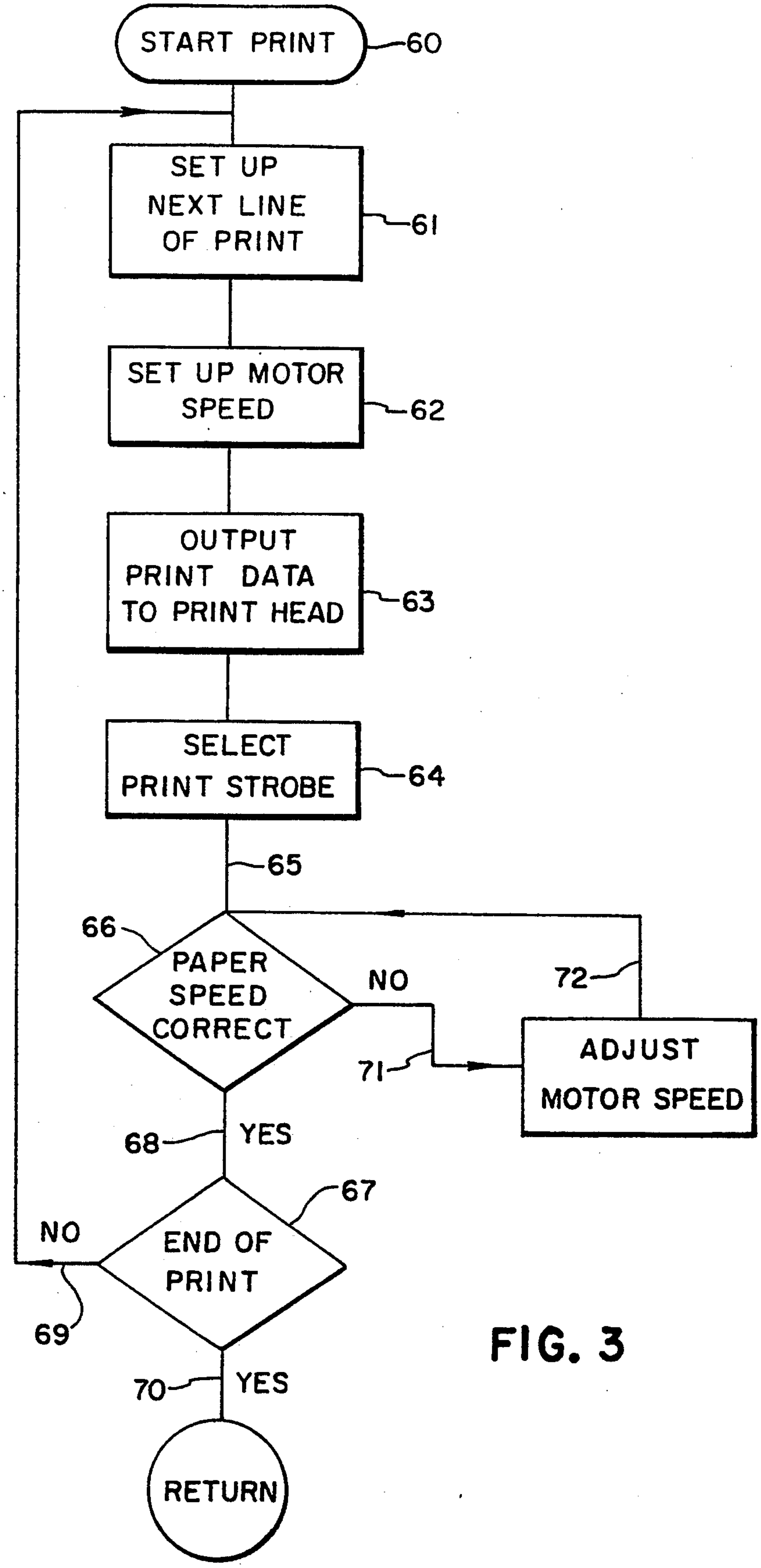
FIG. 3 is a flow chart of a print routine of the stamp printer and FIG. 4(*a*) illustrates the format of a pre-printed paper tape, FIG. 4 (*b*) illustrates the format of a stamp printed on the paper tape of FIG. 4(*a*) by the stamp printer, FIG. 4(*c*) illustrates the format of a stamp printed on a plain paper tape.

FIG. 3 illustrates the sequence of operations in a print routine in which print data is output to the print head and in which the speed of the motor is controlled. After initiation 60 of a print routine, print data for the next line to be printed by the print head is set up 61 from a table stored in one or more registers of the read only memory 11 by the micro-processor 10. The micro-processor outputs a control signal on line 18 to the motor drive circuit to cause the motor to be energised 62 to provide a desired drive speed for the feed roller. The print data for the next line to be printed is output 63 to the print head and the print head is energised by a print strobe signal 64 to cause those elements, selected to be energised by the print data, to be energised to print a line of the required stamp impression on the paper tape. The micro-processor then samples the output from the sensor 19 to check 65 whether the speed of rotation of the feed roller is correct 66. If the roller speed is correct and decision block END OF PRINT 67 indicates that further lines of print are to be printed 68, the next line of print is set up and the print routine repeated as described hereinbefore. If all lines of print have been printed 69, the print routine is ended 70 . If, when the micro-processor samples the output of sensor 19, the speed of the roller is not correct 71 the micro-processor modifies the output to the motor drive circuit to adjust 72 the power input to the motor such as to tend to bring the feed roller to the required speed prior to effecting printing of the next line of print. After the end 70 of the print routine, the micro-processor 10 outputs a signal on line 30 to operate the paper cutter 31 to sever the printed stamp from the remainder of the paper tape.

The stamp printing machine may be powered by an internal DC supply powered from a mains supply or by means of an internal battery. In addition, the random access memory may be powered by a back-up battery in order to retain data, particularly that relating to accumulated postage value, in the event of switching off or failure of the internal battery or the mains power supply. If a calculator is used to provide keyboard and display functions, it may be powered in the conventional manner by its own separate internal battery but it is more convenient to power the calculator from the power supply for the remainder of the stamp machine.

The memory 12 would generally be non-volatile so that it will continue to retain the record of postage values printed after the stamp machine is switched off. For this purpose, a back-up battery would be provided to power the memory 12 when power to the stamp machine is switched off. Thus the memory 12 may be utilized to provide a long term record of usage of the machine. The memory 12 may store a rate chart to provide data relating to postage charges and data which is varied from time to time, for example due to changes in the postage charges set by the postal authority, may be changed by inputting new data via the keyboard or via an external connection to the stamp machine.

It will be appreciated that if a calculator is utilized to provide display and keyboard functions, the memory of the calculator will only retain data while the calculator is powered. Hence the calculator memory may be utilized to accumulate and store the cumulative postage values printed in a session of use of the machine, for example during use of the machine during one day. The memory may then be cleared at the end of the session, or will be cleared by switching off the stamp printing machine, and will be ready to accumulate and store the cumulative postage values printed in the next session of use.

Figure 4A:
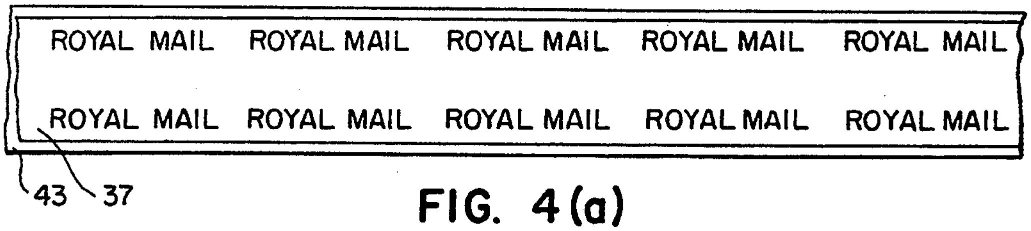
Figure 4B:
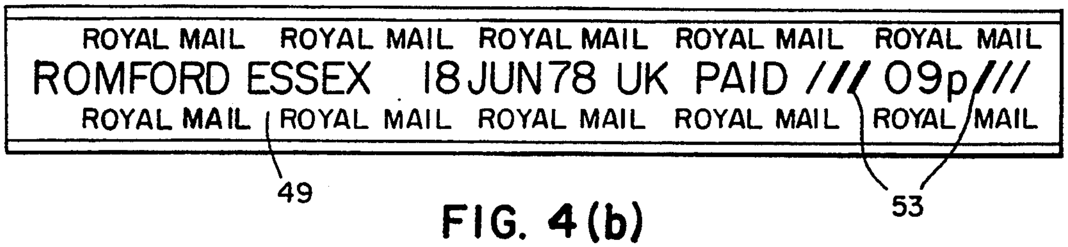
Figure 4C:
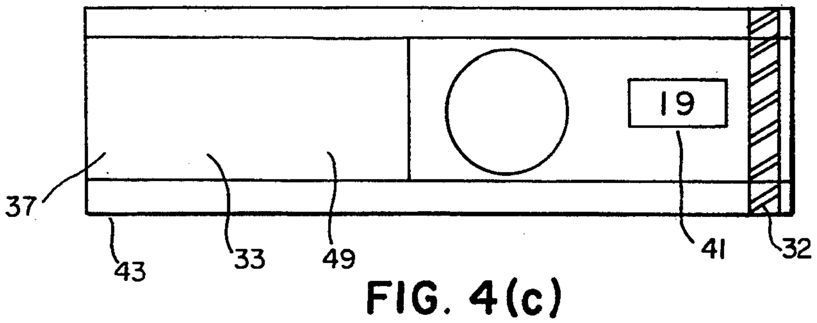

The paper tape 37 on which the stamp is to be printed may be pre-printed with fixed postal data as shown in FIG. 4(*a*) and postage data relating to the specific stamp is printed thereon by the stamp printer to produce a completed stamp 49 as shown in FIG. 4(*b*). Alternatively the paper tape may be totally blank and the completed stamp 49 then carries only data printed on the paper tape by the stamp printer as shown for example in FIG. 4(*c*). Preferably the stamps of either form include reference identity marks to enable the location of the stamp and/or selected printed data to be identified by machine reading facilities operated by a postal authority. Marks 53 identifying specific data carried by a printed stamp may be printed on the stamp by the print head as part of the print routine. Thus when a mail item bearing a printed stamp is passed through the machine reading device, detection of one mark identifies the start of the postage value and detection of the subsequent mark identifies the end of the value. Marks provided for a machine reading device to identify the location of the printed stamp and a value or code 41 thereon may comprise a stripe 32 printed with fluorescent ink. This stripe would be printed by a separate print head which may comprise a pre-impregnated pad moved into contact with the label. Conveniently, the pad may be secured to the paper cutter such that when the cutter is operated, the pad is brought into engagement with the stamp which has just been printed.

The data printed on the paper tape to form the stamp may additionally include advertising material such as shown at 33 in FIG. 4(*c*). It is preferred that the paper tape 37 has a self adhesive back surface to facilitate adhering of the printed stamps to mail items. Accordingly, the paper tape is provided with an easily removable backing layer 43.

Instead of using a tape of heat sensitive paper and printing by the action of heat on the heat sensitive paper, printing may be effected utilizing a thermal transfer ribbon for printing onto a tape of non-sensitive paper. However this would require the provision of a ribbon feed mechanism.

In use of the stamping machine, mail items bearing stamps printed by the machine can be taken to a postal authority and the total of postage due would be paid. Thus only those items for which postage is paid would be accepted and handled by the postal authority. To the user advantages over use of stamps sold by the postal authority include the ability to project a business image by the inclusion of advertising material in the printed impression, convenient preparation of mail items and flexibility of being able to print diverse postage values as required without the need to keep a stock of postage stamps of sufficient different values to enable the required diverse postage values to be made up. To the postal authority there would be the advantage of only requiring a single payment without the need to provide printed stamps.

Figure 6:
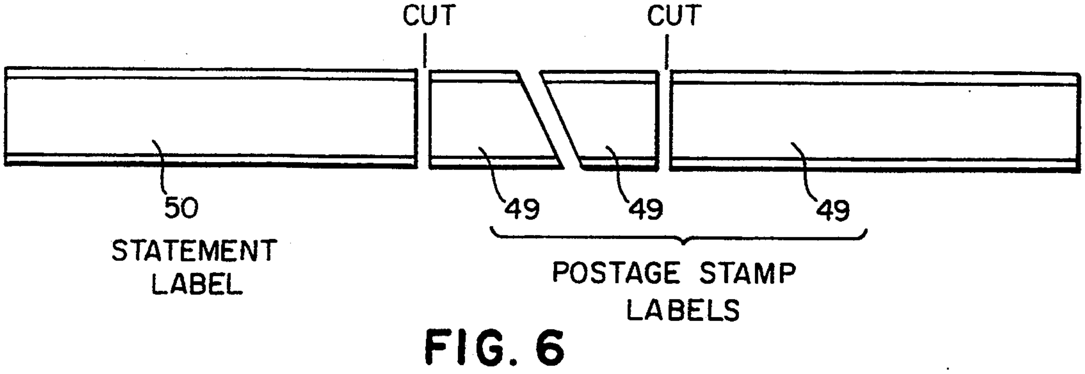
FIG. 6 illustrates a sequence of stamps and a label printed on the tape and severed therefrom.

The printer may be arranged to be able to print a statement label 50 after completion of a session of use of the machine in which a series of stamps have been printed and severed as shown in FIG. 6. Such a label may include a listing of individual items with postage values together with a total of number of items and total postage value. Furthermore data on the printed stamps 49 and statement label 50 may be in machine readable form to enable mechanised reading of the stamps and/or statement label at a service counter. If the printed data includes identification of a user account it would be possible for unrestricted posting of mail items at any convenient entry point to the postal service. For this purpose the identification data and payment data would need to be provided in a secure form to prevent fraud. In order to effect this security of data, the read only memory 11 would store an algorithm and a user would enter and store an account code in the memory 12. The user would enter a personal identifier (PIN) at the start of a stamp printing session and this would be used as an encryption key with the algorithm to code data including the account data and payment data for any set of mail items stamped in a session. An authorisation for payment together with the statement label and set of mail items bearing stamps printed by the stamp machine would be placed in a special service identified envelope and posted as a single entity. The receiving office of the postal authority would then remove the items from the envelope and verify the correctness of the charging data by machine reading the stamps and statement label and then use the machine read charge data to carry out accounting functions to debit the users account and to update the account records of the postal authority. The random access memory, or part thereof powered by back-up battery may be utilized to store the account code and if desired it may store a table of postage values related to type of service and weight of mail item. The program for the micro-processor 10 would then include a routine to calculate postage rates from an input on the keyboard of the mail item weight and the service required, e.g. first or second class inland or surface or airmail overseas postage.

The stamp printing machine may be arranged to accommodate differing requirements by different postal authorities with regard to the format of the printed stamp or statement label. Thus fixed printing data may be loaded at a service point and stored in a part of the random access memory powered by back-up battery.

Figure 5:
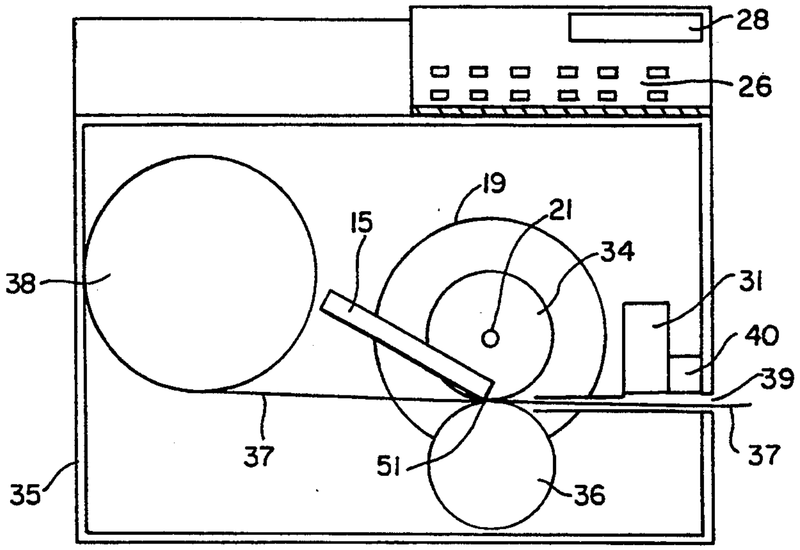
FIG. 5 shows diagrammatically the mechanical arrangement of components forming the stamp printer.

The mechanical arrangement of components of the stamp printing machine is shown in FIG. 5 in a housing 35. The thermal print head 15 is located between a pair of feed rollers 34 on a common drive shaft 21, the disc of the sensor 19 also being mounted on this shaft. The pressure roller 36 extends across the width of the print head and across the pair of feed rollers and is resilient or resiliently mounted to press against print thermal elements, indicated by reference 51, of the print head and against the pair of feed rollers 34. The feed rollers are driven by an electric motor (not shown) to draw a paper tape 37 from a roll 38 of tape and to feed the tape past and in contact with the print head elements to an exit slot 39 in the housing. Between the print head and the exit slot there is located a cutter 31 which may be operated, manually or by an output from the micro-processor as hereinbefore described, to sever the printed stamp from the web of paper tape. A pad 40 pre-impregnated with fluorescent or phosphorescent ink is mounted adjacent the cutter 31 and operable by operation of the cutter to print the fluorescent or phosphorescent stripe 32 across the end of the printed stamp. Thus the label separating means and the stripe printing means are integrated with one another and ensure correct positioning of the stripe relative to the stamp. However, if desired, the paper tape may be provided with the stripe 32 preprinted on the tape and the stamp printer would then be provided with the sensor 52 connected to the microprocessor 10 via the input/output circuit 13 to detect the stripe and thereby enable the printing of the stamp to be correctly positioned relative to the stripe.

While the stamp printer has been described hereinbefore in relation to printing of postage stamps for use in a mail system operated by a postal authority, the stamp printer may be utilized in connection with services provided by a number of carriers by the provision of different print formats for stamps and statement labels and different registers in the memory.

I claim:

1. A postage stamp printing machine including:

a calculator module including a keyboard, a data display device and electronic calculator means;

said electronic calculator means being operable to scan keys of said keyboard to detect operation of said keys and thereby input data corresponding to operated ones of said keys to said electronic calculator means;

said electronic calculator means being operative in response to said input data to drive said display device to display said input data;

electronic accounting and control means including memory means for storing accounting data and electronic processing means for carrying out accounting operations on said accounting data and for reading and writing said accounting data respectively from and to said memory means;

an interface circuit connected to said electronic processing means and responsive to scanning of said keys by said electronic calculator means to input said input data to said electronic processing means;

each key of the keyboard including a pair of electrical contacts and for each said key said interface circuit including switch means connected across said pair of electrical contacts and wherein the electronic processing means generates output signals representing data to be displayed to operate said switch means in emulation of operation of said keys;

operation of said switch means being detected by scanning of said electrical contacts of said keys by the electronic calculator means to thereby input said data represented by said output signals to said electronic calculator means to cause said electronic calculator means to drive the display device to display said data represented by said output signals;

thermal printing means including a line of thermal printing elements;

feeding means for feeding a mail item past said line of thermal printing elements in a direction transverse to said line of printing elements;

a drive motor having a variable operational speed dependent upon electrical input power to said drive motor and said drive motor being drivingly connected to said feeding means to drive said feeding means at a feed speed dependent upon said operational speed of said drive motor;

sensing means responsive to said feed speed of said feeding means;

control means responsive to said sensing means to control said electrical power input to said drive motor to control said operational speed of said motor and thereby control said feed speed of said feeding means to feed the mail item substantially in synchronism with operation of said printing elements in said series of clock cycles;

storage means for storing data relating to fixed postage data; and said electronic accounting and control means being responsive both to said data stored by said storage means relating to fixed postage data and to said input data representing selected variable postage data to produce printing data signals to operate said line of thermal printing elements selectively in a series of clock cycles to print in a line by line manner said fixed postage data and said selected variable postage data on said mail item during feeding of said mail item past said line of thermal printing elements.

2. A postage stamp printing machine as claimed in claim 1, further including severing means operable to sever a length of postage tape bearing the fixed postage data and the variable postage date printed by operation of the printing means from a supply of said postage tape.

3. A postage stamp printing machine as claimed in claim 2, further including a pad impregnated with ink movable into engagement with the length of postage tape to impress thereon an ink mark, said pad being movable into said engagement with said length of postage tape by operation of the severing means.

4. A postage stamp printing machine including:

a calculator module including a data display device;

electronic calculator means operable to drive said display device;

a keyboard having keys manually operable to an operated state;

scan lines connecting said keys of the keyboard to said electronic calculator means and said electronic calculator means;

said electronic calculator means being operable to detect via said scan lines any of said keys in said operated state and to operate said keys in said operated state;

electronic accounting and control means;

an interface circuit connected to said scan lines of said calculator module and operative in response to detection of operated ones of said keys by said electronic calculator means to generate input data corresponding to said keys in said operated state;

said electronic accounting and control means including memory means for storing accounting data and electronic processing means for reading and writing said accounting data respectively from and to said memory means and operable to carry out accounting operations in respect of said accounting data and selected variable postage data input represented by said input data generated by said interface circuit as a result of manual operation of said keys of said keyboard;

each key of the keyboard including a pair of electrical contacts and for each said key said interface circuit including switch means connected across said pair of electrical contacts and wherein the electronic processing means generates output signals representing display data to operate said switch means in emulation of operation of said keys;

said electronic calculator means being operative to detect via said scan lines operation of said switch means and to drive the display device to display said display data;

printing means; and said electronic accounting and control means being responsive to said input data and representing selected variable postage data to produce printing signals to operate said printing means to print said selected variable postage data.

5. A postage stamp printing machine as claimed in claim 4, wherein the calculator module includes data storage means; and the electronic calculator means is operable in response to operation of keys of the keyboard to input selected postage values to said data storage means.

* * * * *